United States Patent [19]
Cameron

[11] Patent Number: 5,976,374
[45] Date of Patent: Nov. 2, 1999

[54] SELF-CLEANSING FILTER

[75] Inventor: Dean Osman Cameron, Maleny, Australia

[73] Assignee: Dowmus Pty Ltd, Maleny, Australia

[21] Appl. No.: 08/930,950

[22] PCT Filed: Apr. 9, 1996

[86] PCT No.: PCT/AU96/00202

§ 371 Date: Oct. 3, 1997

§ 102(e) Date: Oct. 3, 1997

[87] PCT Pub. No.: WO96/31266

PCT Pub. Date: Oct. 10, 1996

[30] Foreign Application Priority Data

Apr. 7, 1995 [AU] Australia ........................ 2217

[51] Int. Cl.⁶ .................. C02F 3/32; C02F 3/00
[52] U.S. Cl. ............. 210/610; 210/602; 210/617
[58] Field of Search ................... 210/602, 610, 210/617

[56] References Cited

U.S. PATENT DOCUMENTS

| 3,635,816 | 1/1972 | Golub | 210/602 |
| 3,785,798 | 1/1974 | Horai et al. | 71/79 |
| 4,285,719 | 8/1981 | Criss | 71/13 |
| 4,624,786 | 11/1986 | Schlegel | 210/414 |
| 5,407,576 | 4/1995 | Wolf et al. | 210/602 |
| 5,633,163 | 5/1997 | Cameron | 435/262 |

FOREIGN PATENT DOCUMENTS

| 0431993 | 6/1991 | European Pat. Off. . |
| 02218498 | 2/1989 | Japan . |
| 03094894 | 9/1989 | Japan . |
| 04100597 | 5/1996 | Japan . |

*Primary Examiner*—C H Kelly
*Attorney, Agent, or Firm*—Knobbe Martens Olson & Bear, LLP

[57] ABSTRACT

A self cleaning filter for aqueous media such as sewage effluent which comprises a ventilated bed of discrete filtration material such as particulates, finely ground or shredded non-oil plastic materials, clay particulates, ground zeolite, diatomaceous earth powdered activated carbon, short fibre carbon and fine crushed charcoal, in which is dispersed a population of living organisms such as worms, insects, mothfly larvae, collembola, crustaceans and mites, which organisms have the ability to maintain at least a surface layer of the bed in an open and aerobic state.

9 Claims, No Drawings

SELF-CLEANSING FILTER

BACKGROUND OF THE INVENTION

THIS INVENTION relates to filters, particularly to self cleansing filters for aqueous media.

Aqueous media such as sewage effluent, water for consumption, swimming pool water, industrial effluent, aquaculture pond water and the like, are commonly filtered with particulate filtering materials such as sand, in order to remove suspended solids and biologically active material. Such filtering materials have the disadvantage that they are prone to clogging due to microbial growth on the surface of the filter bed where the organic matter from the raw aqueous media is retained and exposed to oxygen and endemic microbes.

Many sophisticated arrangements have been devised to address this problem of clogging, including moving bed filters, raking devices for the particulate bed surface, and other physical means which break up the filter material.

The use of relatively coarse filtering material and the expansion of the infiltration area have also been used. Unfortunately such methods generally involve high maintenance and have lower treatment performance and typically high construction costs. There is also the need to replenish the upper layers of the particulate filtering material from time to time.

OBJECT OF THE INVENTION

It is therefore an object of the present invention to provide a filter for aqueous media which obviates or at least minimises the aforementioned disadvantages, and provides the public with a useful alternative.

SUMMARY OF THE INVENTION

According to the present invention there is provided an aqueous media treatment system which comprises a ventilated bed of discrete filtration material in which is dispersed an aggregation of living organisms which have the ability to maintain at least a surface layer of the bed in an open and aerobic state.

DETAILED DESCRIPTION OF THE INVENTION

In certain situations such as when the aqueous media is applied by a flood discharge, the surface of the filter bed may be covered with a water and air permeable barrier which excludes some of the light. Such a permeable barrier is preferably designed to also disperse the aqueous media over the surface of the filtration material in such a pattern that the zone furthest from the boundaries of the filtration material receive the highest loading without washing channels in the filtration material. However such dispersion can also be achieved by drip, seepage, sprinkler or mist irrigation over the surface of the permeable barrier; or by the use of a channelling material atop the permeable barrier.

A function of the permeable barrier is to exclude some of the light and thereby provide habitat conditions which suit the grazing organisms, while permitting the passage of the aqueous medium to be filtered. A particularly preferred permeable barrier is a synthetic fibrous matting material such as plastic fibre wadding. Such a material can also double as a dispersant for the aqueous medium.

The discrete filtration material is suitably a low bulk density material having a large surface area and amorphous structure which does not easily form stable aggregates. The material can have a wide range of physical structures from particulate through to fibrous, or combinations of these. Examples include silica particulates such as fine sand, finely ground or shredded non-oily plastics materials such as fine ground polystyrene foam, clay particulates, ground zeolite, diatomaceous earth, powdered activated carbon, short fibre carbon, fine crushed charcoal, and combinations of these materials.

A preferred criterion in the selection of the discrete filtration material mix is that it does not form water stable aggregates in the lower layer/layers. Such aggregation has the effect of preventing large pore spaces from collapsing under saturated conditions and so allows the aqueous medium to pass untreated through the channels produced by the organisms.

Small shallow pore spaces which do not penetrate through the entire bed depth are desirable in that they improve the oxygenation of the bed and infiltration rates. These upper pore spaces can be relatively stable due to the presence of organic matter and in particular secretions by worms if present.

The organisms are selected from multi-cellular grazing organisms which have a proclivity for consuming microbial slime and organic fractions which tend to build up on the surface and within the pores of the filtration material. Depending upon the nature of the aqueous medium to be treated, a single species of organism can be selected, or a combination of two or more organisms can be utilised. It is generally found that more than two ORDERS of organisms are required for maximum efficiency. Such organisms are typically chosen to have symbiotic relationships. The selection of a multiplicity of organisms is generally required when the aqueous medium comprises a wide range of constituents, as in the case of sewage effluent. Suitable grazing organisms include composting worms, earth worms, segmented mangrove worms, insects, mothfly larvae, collembola, crustaceans and mites. Among each of these ORDERS, SPECIES are selected to suit the particular ambient climatic conditions and the salt concentrations of the aqueous medium to be filtered.

Suitable organisms have one or more of the following characteristics:

1. an ability to ingest organic material and microbes living on and around the filtration material;
2. an ability to ingest filtration material and digest the organic material and microbes living on and around the filtration material;
3. an ability to draw oxygen directly from the air for their metabolic needs;
4. an ability to form small dynamic pores in the upper surface of the filtration material thus dramatically increasing the infiltration surface area;
5. an ability to tolerate periodic inundation;
6. an ability to tolerate low oxygen levels in the filtration material and the applied aqueous media; and
7. an ability to tolerate typical levels of salts and $NH_4$ in the filtration material and applied aqueous.

The aqueous medium to be filtered can comprise a wide range of ratios of water to suspended/dissolved solids or salts. Preferably, the aqueous medium is it aerobic, however anaerobic media can be treated if oxygen is accessible to the organisms in the filtration material or if the aqueous medium is misted onto the filter bed through a ventilated air space.

The hydraulic application rates will vary depending on the particular medium chosen but to a certain extent can be manipulated by selecting different proportions of low bulk density materials, for instance charcoal or granulated polystyrene foam, and higher bulk density material such as sand. Preferably such application will be in pulsed cycles to enable air to be drawn down into the filter bed in the alternating cycles as the saturated zone moves down through the filter bed.

Spelling of the filter bed can improve treatment efficiency by allowing more complete breakdown of accumulated slowly degradable organic fractions following drying cycles. This often occurs during normal usage in a domestic application but may need to be deliberately imposed in a commercial scale operation.

Filters according to the present invention have the advantage that their sizes can be significantly less than is required for conventional filters, due to the biological activity present and as a consequence of this specific biological activity the higher infiltration rates.

Further such biologically activated filters require little or no maintenance to keep them from blocking, and have a surface which is open and friable allowing much more oxygen to penetrate more deeply into the bed. This enables a wider band of biological activity within the bed and hence more extensive treatment.

The filters also have the advantage that much finer filtration media (for example a filtration media with an effective particle size of 0.1 mm or less has been found to give very good results) can be used and can provide much higher long term infiltration rates than are normally possible for intermittent sand filters with an effective particle size of 0.6 mm which do not have these types of organisms introduced into them.

By sloping the entire bed a gradient of aqueous media application rates is created as the media flows over and into the surface thus creating a range of habitat niches which enable stable but moving populations of organisms to establish. This provides more stability to the overall process.

Any shaped container which is ventilated and covered to substantially exclude light can be adapted for use for this process.

DESCRIPTION OF PREFERRED EMBODIMENT

A medium of finely ground powdered activated carbon with an effective particle size of about 0.1 mm is arranged in an elongated sloping bed provided with ventilated under drainage in an enclosed vessel. The depth of the medium is approximately 100 mm deep. A geotextile membrane is inserted below the fine filtration medium to prevent the activated carbon medium from washing through to drainage medium located below the membrane. As a guide line the surface area of the vessel is such that one square metre is provided for each 250 litres also applied each day. Passive ventilation is provided to the air space above and below the activated carbon medium.

The surface of the packed bed is shaped to ensure that the edges near the sides of the enclosed vessel are higher than the surfaces remote from the vessel edges. If the aqueous media is applied by flood discharge as though a drain pipe the surface can be protected from erosion by a cover of open felted polyester wadding or similar material. A lid to substantially exclude light, rain and other intrusions is placed over the vessel.

The medium is inoculated with soil and litter organisms selected from composting worms, earthworms, segmented mangrove worms, insects, mothfly larvae, collembola, crustaceans and mites. The aqueous media to be treated is dispersed over the surface of the wadding material or like material from above and passages through the open channels of the filter bed to exit as a filtrate at a lower end.

In a further refinement relevant to situations where the filtrate is to be discharged into a waterway, phosphates can be removed from the filtrate by replacing the synthetic wadding material with a wad of steel wool or similar ferrous product. The steel wool or similar ferrous product in this case rusts on the surface and provides a suitable method of precipitating soluble phosphates. The steel wool or similar ferrous product must be replenished from time to time to continue the effectiveness of the filter as a phosphorous adsorption filter.

Filtered primary effluent or secondary treated effluent as generated by a typical household, can be successfully treated to a tertiary standard using this compact and simple to construct apparatus which requires no back-flushing.

Whilst the above has been given by way of illustrative example of the invention, many modifications; and variation may be made thereto by persons skilled in the art without departing from the broad scope and ambit of the invention as herein set forth.

I claim:

1. An aqueous media treatment system which comprises a ventilated bed of discrete filtration material in which is dispersed a population of multicellular grazing organisms which maintain at least a surface layer of the bed in an open and aerobic state.

2. An aqueous media treatment system as claimed in claim 1, wherein the multi-cellular grazing organisms are selected from the group consisting of composting worms, earth worms, segmented mangrove worms, insects, mothfly larvae, collembola, crustaceans and mites, and combinations thereof.

3. An aqueous media treatment system as claimed in claim 1, wherein the discrete filtration material has a bulk density, a surface area and an amorphous structure which do not allow it to form stable aggregates.

4. An aqueous media treatment system as claimed in claim 3, wherein the discrete filtration material is selected from the group consisting of silica particulates, ground or shredded non-oily plastic materials, clay particulates, ground zeolite, diatomaceous earth, powdered activated carbon, fibrous carbon, ground charcoal, and combinations thereof.

5. An aqueous media treatment system as claimed in claim 1, wherein the bed of discrete filtration material has a surface contour which is shaped so as to channel the aqueous media away from the boundaries thereof.

6. An aqueous media treatment system as claimed in claim 1, wherein the bed of discrete filtration material has a surface which slopes away from an input region for the aqueous media.

7. An aqueous media treatment system as claimed in claim 1, wherein the bed of discrete filtration material is covered with an air and water permeable cover which excludes a predetermined amount of the incident light for optimal survival of the living organisms.

8. An aqueous media treatment system as claimed in claim 7, wherein the cover is a synthetic fibrous matting material.

9. An aqueous media treatment system as claimed in claim 1, wherein the discrete filtration material is sand the multi-cellular grazing organisms comprise earthworms, mites, and mothfly larvae, and the aqueous media is waste water.

* * * * *